United States Patent [19]

Gilleo et al.

[11] 4,353,858
[45] Oct. 12, 1982

[54] METHOD FOR FORMING A BOSS UPON A THERMOPLASTIC POLYMER SURFACE AND RESULTING ARTICLE

[75] Inventors: Kenneth B. Gilleo; Willard H. Kriebich, both of Sparta, Wis.

[73] Assignee: Northern Engraving Corporation, Sparta, Wis.

[21] Appl. No.: 220,087

[22] Filed: Dec. 24, 1980

[51] Int. Cl.³ .............................................. B32B 3/30
[52] U.S. Cl. .................................... 264/268; 156/219; 264/293; 264/294; 264/299; 264/322; 428/156; 428/187
[58] Field of Search ................ 156/219, 220; 264/268, 264/293, 294, 299, 322; 428/13, 156, 187

[56] References Cited

U.S. PATENT DOCUMENTS

| | | | |
|---|---|---|---|
| 2,306,256 | 12/1942 | Wickwire, Jr. et al. | 156/219 |
| 2,370,028 | 2/1945 | Freiberg | 428/131 |
| 2,704,211 | 3/1955 | Decepoli | 428/13 X |
| 3,217,617 | 11/1965 | Wiswell | 264/259 X |
| 3,953,910 | 5/1976 | Farb | 156/298 X |
| 3,963,847 | 6/1976 | Norgard | 428/147 |
| 4,307,527 | 12/1981 | Suzuki | 428/13 X |

*Primary Examiner*—Henry F. Epstein
*Attorney, Agent, or Firm*—Michael L. Dunn

[57] ABSTRACT

An article comprising a thermoplastic polymer having an essentially planar surface provided with a surface pattern defined and encompassed by at least one continuous self-connecting retaining dam; at least a portion of the dam comprising at least one debossed region between at least two essentially parallel raised ridges; a further article comprising the foregoing article having a boss formed from a hardened resin over the surface pattern to a depth at least equal to the height of the highest of the raised ridges; and a method for manufacturing the articles by heating the surface to a temperature above the deformation temperature of the polymer and impressing the surface with a debossing die to form the portion of the article having the debossed region and raised ridges and introducing a liquid resin into the surface pattern followed by solidifying the resin to form the article having the boss.

19 Claims, 5 Drawing Figures

METHOD FOR FORMING A BOSS UPON A THERMOPLASTIC POLYMER SURFACE AND RESULTING ARTICLE

BACKGROUND OF THE INVENTION (A) Field of the Invention

This invention relates to forming a boss, i.e., an elevated area upon a surface and more particularly relates to the formation of such a boss upon an essentially planar non-porous thermoplastic polymer surface. The invention further relates to articles having such an elevated portion or boss.

(B) History of the Prior Art

The formation of protruding or elevated portions from surfaces has been of historical significance both for utilitarian and decorative purposes. Protruding portions from surfaces have been formed since before recorded history and, in fact, historical records themselves are frequently in the form of hieroglyphics or pictographs formed in elevation or relief in stone surfaces. A formation of such protruding surfaces in stone was a tedious and time consuming task, taking days, weeks or months for the completion of a single tablet. Since the advent of higher technologies, protruding surfaces were frequently formed by molding a plastic material, by etching and by metallic embossing wherein an embossing die is forced into one surface of a relatively thin sheet or plate causing an elevated portion or boss on the reverse surface of the sheet or plate.

Since thermoplastic organic polymers have been available, various methods have been tried for forming bosses using such polymers. Such methods have not been entirely satisfactory particularly when a very high gloss surface is desired. For example, such thermoplastic polymers have been molded by casting. Casting techniques, in the absence of pressure, have not always been satisfactory since the thermoplastic polymer did not always reach all mold crevices. Furthermore, mold marks caused by machining and polishing, as well as the presence of dirt on the mold surface, often unacceptably reduced the gloss of the finished article. Furthermore, the manufacture of molds for such thermoplastic polymers was exceedingly time consuming, intricate and costly. Another molding method, injection molding, wherein high pressure is used, practically eliminated the problem of the thermoplastic reaching all areas of the mold; however, the molds required for injection molding are even more costly and difficult to manufacture. Even with high polish, such molds still often do not permit a gloss as high as desirable.

Such molding methods, as above described, are particularly undesirable for the manufacture of organic plastic articles wherein small numbers of articles are desired due to the difficulty of mold manufacture and resulting high cost per article. Furthermore, when molds are used for manufacturing articles having bosses, rapid set up time to manufacture the articles is virtually impossible due to the lengthy mold manufacturing process.

Attempts have been made to manufacture organic plastic articles having bosses by pouring a solidified liquid plastic onto the surface to form a protrusion which remained due to surface tension. It was subsequently discovered that if the liquid plastic either flowed to a sharp peripheral edge or it was poured into a cavity, better relief and definition could be obtained.

More recently, in order to avoid the problems with forming cavities, a retaining edge or dam was screened onto the face of a plastic sheet. The dam then acted as a retaining wall to hold the liquid plastic. Such screening processes were still more complex than desired and did not result in retaining dams which were as efficient as desired.

It was known in the prior art that plastics could be impressed to form a debossed pattern area surrounded by the ridge at the edges of the debossed zone. See e.g. U.S. Pat. No. 2,306,256. In was not, however, recognized that a continuous multi ridge dam defining a pattern area could be formed by impressing thermoplastic surface with a debossing die.

BRIEF DESCRIPTION OF THE INVENTION

In accordance with the invention, there is provided an article which comprises a base made of a non-porous thermoplastic polymer. The base has an essentially planar surface provided with a surface pattern defined and encompassed by at least one continuous self-connecting retaining dam, at least a portion of which comprises at least one debossed region between at least two essentially parallel raised ridges. In general, the width of the debossed area is less than five times the width of the widest ridge and less than five times the height of the highest ridge.

In an additional embodiment, the article further comprises a hardened resin over the surface pattern to a depth at least equal to the height of the highest of the raised ridges.

The invention further comprises the methods for manufacturing the articles of the invention. In particular, the methods are methods for forming a dam and a boss upon an essentially planar non-porous thermoplastic polymer surface. In a first method step, the thermoplastic polymer surface is heated to a temperature above the deformation temperature of the thermoplastic polymer and below the decomposition and melt stick temperatures of the thermoplastic polymer. In a second step, the thermoplastic surface is impressed for from about 0.1 to about 10 seconds with a debossing die. The die has at least one edge in the shape of a first pattern and usually has at least one continuous edge defining and encompassing a first pattern area. The impressing with the die forms a second pattern area on the surface which is defined and encompassed by a continuous self-connecting retaining dam on the surface. The portion of the dam, formed by the impressing, comprises at least one debossed region between at least two essentially parallel raised ridges having upper edges. In general, the second pattern area is usually a mirror image of the first pattern area of the die.

In a third step, to form an article having a boss, a liquid resin is introduced into the second pattern area in a quantity sufficient to fill the pattern area and insufficient to overflow the dam. The resin is solidifiable at a temperature below the deformation temperature of the thermoplastic polymer. In addition, the thermoplastic polymer, prior to solidification of the liquid resin, has reaction and solubility rates with the liquid resin which are sufficiently slow to prevent significant weakening of the thermoplastic polymer.

In the final step of the method of the invention, while the upper edge of each of the ridges is in an essentially horizontal plane, the liquid resin is solidified to form an elevated boss defined by the shape of the retaining dam.

The article and method overcome many of the disadvantages of prior art methods and articles. In particular, the need for expensive molds which are difficult and require substantial time to manufacture is eliminated. Retaining structures, of the type which were difficult to make by prior art means, are eliminated and high gloss on the surface of the finished boss is obtained.

DETAILED DESCRIPTION OF THE INVENTION

Figure 1:
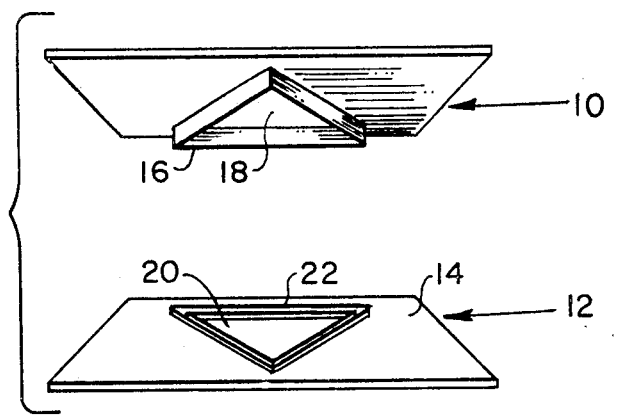
FIG. 1 is a front perspective view of an article of the present invention having a continuous retaining dam with the die used to form the dam.

The boss which is formed upon the thermoplastic polymer surface is simply an elevated portion protruding from the surface. Such bosses, when they are transparent and have exeedingly high gloss smooth surfaces, are frequently known in the art as lenses. The surface upon which the boss is formed, in accordance with the invention, is an essentially planar, desirably, but not necessarily, non-porous, thermoplastic polymer surface. "Essentially planar", as used herein, means that the periphery of the surface area is generally located within the same plane, although slight deviations of the periphery from a single plane, can be tolerated, e.g., deviations due to surface roughness. In addition, slight deviations from the single plane within the surface defined by the periphery can also be tolerated. Deviations which vary from the plane defined by the periphery of the surface area by a distance greater than the depth of the boss at the deviation point are not usually desirable. The depth of the boss, at a particular location, is considered to be the distance from the surface of the boss to the plane defined by the periphery of the boss.

The non-porous thermoplastic polymer surface in general may be manufactured from any non-porous thermoplastic polymer and may comprise a single self-supporting thermoplastic polymer article having a surface, such as a plastic sheet or plate, or may comprise a layer or layers of thermoplastic polymer upon essentially any substrate such as a substrate manufactured from metal, ceramic, unsaturated polyesters, thermoset polymers or other thermoplastic polymers. "Thermoplastic polymer", as used herein, includes all polymers which are thermoplastic at the time the polymer is impressed and includes thermosetting prepolymers such as B stage thermoset resins.

Examples of especially suitable thermoplastic polymers are linear polycarbonates, modified cellulosics, polyesters, acrylics, polyamides, or polyvinyl polymers.

In general, the polycarbonates are those polycarbonates commercially known, which in general are prepared by the reaction of bisphenols with phosgene or by transesterification of diphenyl carbonate and bisphenols. Examples of cellulosics are cellulose acetate, rayon, cellulose nitrate and especially cellulose acetate butyrate. Examples of polyesters are those polyesters which are the reaction product of a dihydric alcohol and terphthalic acid. Examples of acrylics are the acrylonitriles and especially polyacrylate and polymethacrylates. Examples of polyamides are the nylons and examples of polyvinylpolymers are polyvinylacetate, polyvinylchloride, polystyrene and polyolefins including polyethylene, polypropylene, polytetrafluoroethylene, polyvinyl-chloride and polyvinylidenechloride.

In the first step, in accordance with the method of the invention, the thermoplastic polymer surface is heated to a temperature above the deformation temperature of the thermoplastic polymer and below the lower of the decomposition or melt stick temperatures of the thermoplastic polymer. "Deformation temperature", as used herein, means the temperature at which the thermoplastic polymer will deform at the applied force. The deformation temperature, therefore, increases as the force applied decreases. For example, a larger force is applied when the debossing die impresses the thermoplastic surface, than the force applied to the walls of the dam by liquid resin being held by the walls. The deformation temperature is therefore lower for impressing the surface than the deformation temperature which will cause the walls of the dam to deform from the force applied by retained liquid resins. Usually the deformation temperature is near the Vicat Softening Point (ASTM D1525).

"Melt stick temperature" is the temperature at which the thermoplastic polymer solid, rubbed across a metal surface begins to melt and/or adhere (see *Textbook of Polymer Science*, by Billmeyer, J. Wiley Publisher). Desirably, the heating temperature is between about 3° C. above the deformation temperature of the thermoplastic polymer and about 3° C. below the decomposition or melt stick temperatures of the thermoplastic polymer whichever is less. Most desirably, the heating temperature is near the midpoint of the range between the deformation temperature of the thermoplastic polymer and the melt stick temperature of the thermoplastic polymer. More specifically, the heating temperature most desirably occupies a range of about 40% of the range between the deformation temperature and the lesser of the decomposition or melt stick temperatures of the thermoplastic polymer wherein the midpoints of the 40% range and the range between the deformation temperature and the lesser of the decomposition or melt stick temperatures are the same.

The heating of the thermoplastic polymer may be accomplished by any suitable means including heating the polymer in an oven, by microwaves, by dielectric heating, by using a hot impressing or debossing die or otherwise. For example, a debossing die heated to from about 175° to about 250° C. has been successfully used.

Prior to or simultaneously with the heating of the thermoplastic polymer, the thermoplastic surface is impressed for from about 0.1 to about 10 seconds with a debossing die. The die has at least one edge in the shape of a first pattern. The edge is usually continuous and defines and encompasses a first pattern area. It is the edge of the die that accomplishes the impressing. The impressing with the debossing die, either alone or in conjunction with existing ridges projecting upwardly from the surface, forms a second pattern area on the surface which is defined and encompassed by a continuous self-connecting retainer dam on the surface. The second pattern area, in general, is the mirror image of the first pattern area formed by the edge of the debossing die. The dam, formed by the impressing, comprises a continuous debossed region between two essentially parallel continuous raised ridges having upper edges. "Debossed", as used herein, means a depressed area below the original thermoplastic surface. In general, the width of the debossed area is less than 5 times the width of the widest continuous raised ridge and less than 5 times the height of the highest continuous raised ridge. Usually the continuous raised ridges are essentially parallel with each other. "Essentially parallel", as used herein, means that the distance between the ridges does not vary by more than 100% over the entire length of the dam.

The debossing die is a die having at least one thin edge, which is usually a self-connecting continuous edge, in the shape of a pattern. Optionally, the die may comprise a plurality of thin edges, desirably continuous, forming a plurality of patterns enclosed by one or more of the die edges. If desired, the edges of the die may be double edges, each double edge defining a pattern as previously described. In general, the edge thickness of the debossing die is from about 0.025 to about 0.4 mm.

The impressing of the thermoplastic surface is accomplished with pressure sufficient to finish the impressing of the surface within the desired time limit which is from about 0.1 to about 10 seconds. Desirably, the impressing time is less than 2 seconds. The pressure required to accomplish the impressing within the time limit is dependent upon the softness of the polymer surface, the sharpness of the debossing die edge, the depth of the desired impression and the desired impressing time. Usually, pressures of one ton or higher can be used without detriment, provided that the depth of the impression is controlled. Usually, the impression depth, in order to form a desired dam, is from about 0.005 to about 0.05 cm.

The impressing of the thermoplastic surface with the debossing die forms a second pattern area on the thermoplastic surface which is the mirror image of the pattern of the die edge. The impression on the thermoplastic surface, when the die edge is continuous, is in the form of a continuous self-connecting retainer dam which comprises a continuous debossed region between two continuous raised ridges having upper edges. The dam defines the second pattern area as previously described. The depth of the debossed area corresponds to the depth of the impression as previously discussed and the width of the debossed region is usually less than five times the width of the widest raised ridge and also less than five times the height of the highest raised ridge. The ridge height usually is between about 0.001 cm and 0.025 cm, although higher ridges can be made. Usually, one of the ridges is from about 0.3 to 1.0 times the height of the other dam; although the relative dam height may be lower, e.g., one of the ridges may be from about 0.05 to about 0.3 times the height of the other ridge. When the die edge is a double edge, the retainer dam additionally comprises an additional debossed region and an additional continuous raised ridge.

The ridges are in general essentially parallel. "Essentially parallel", as used herein, means that the distance between the raised ridges does not vary by over 100% over the entire length of the dam.

In accordance with the method of the invention, desirably, while the upper edge of each of the ridges is in an essentially horizontal plane, a liquid resin is introduced into the second pattern in a quantity sufficient to fill the pattern area and insufficient to overflow the continuous dam. After the liquid resin is introduced, the upper edges may be varied from the essentially horizontal plane in order to cause the liquid resin to flow into all areas of the second pattern area. Such variance is usually less than 45 degrees from the horizontal. "Essentially horizontal", as used herein, means a variance from the horizontal of less than about 10 degrees. After the liquid resin is caused to cover the entire second pattern area without overflowing the continuous dam, the upper edges of the ridges are again placed in a plane which desirably varies from the horizontal by less than about 2 degrees.

The liquid resin is a resin which is solidifiable at a temperature below the deformation temperature of the thermoplastic polymer. The liquid resin is chosen so that the thermoplastic polymer has a reaction and solubility rate with the liquid resin which is sufficiently slow to prevent significant weakening of the thermoplastic polymer prior to solidification of the liquid resin. In general, suitable liquid resins are catalyzed urethanes, catalyzed epoxies and radiation curable polymers. Such resins also include heat curable polymers, which are cured at a temperature below the deformation temperature of the thermoplastic polymer of the surface. An example of a radiation cured polymer is a radiation cured prepolymer containing radiation linkable polythiol and polyene groups. Such a radiation curable resin is a resin known as AM 15D provided by W. R. Grace.

The minimum quantity of liquid resin sufficient to fill the second pattern area is a volume calculated by multiplying the height of the highest of the two ridges times the area of the pattern. Usually, the maximum quantity which can be introduced into the second pattern area without overflowing the continuous dam is a quantity much greater than the minimum quantity previously discussed since, due to surface tension, the volume of liquid resin can actually rise above the level of the dam without overflowing the dam. The maximum quantity, which can be introduced into the second pattern area without overflowing the dam, can sometimes be as much as ten times the minimum volume to fill the pattern area or more.

As previously discussed, the thermoplastic polymer must have reaction and solubility rates with the liquid resin which are sufficiently slow to prevent significant weakening of the thermoplastic polymer prior to solidification of the liquid resin. "Significant weakening", as used herein, means weakening which would prevent the thermoplastic from performing its desired mechanical function due to loss of strength or which would affect the shape of the second pattern area or affect the strength or shape of the dam to the extent that the dam does not function as desired.

The liquid resin and thermoplastic polymer can, of course, react with each other or dissolve in each other, provided that such reaction or dissolving does not occur so rapidly that the liquid resin can not practically be solidified in time to prevent significant weakening of the thermoplastic polymer. In general, any reaction or solubility which occurs in a time period in excess of $\frac{1}{2}$ hour, which would significantly weaken the thermoplastic polymer, is permissible since the liquid resin would be solidified in practical processes before the expiration of a $\frac{1}{2}$ hour time period. Such reactions and solubility rates are sufficiently slow to prevent weakening before solidification of the resin. Reaction or solubility rates which would significantly weaken the thermoplastic polymer in a time period of less than one minute are usually not considered acceptable since hardening times may exceed the one minute time period and since pauses or interruptions in the resin hardening process due to process equipment malfunctions could not be tolerated. Hardening times are much less critical when radiation curable polymers are used because hardening can occur in seconds.

The surface can be coated with a thin, desirably thermoplastic, primer coating when the rate of solubility or reaction with the liquid resin would otherwise be too high. Such coatings can also be used to reduce surface porosity, when the porosity is too high to permit the formation of a good retaining dam.

It is actually desirable for the liquid resin to be somewhat soluble or reactive with the thermoplastic surface to create good adhesion between the solidified resin and the thermoplastic surface. In order to increase the adhesion between the thermoplastic polymer and the resin, the thermoplastic polymer surface may be coated with an adhesive thermoplastic substance (adhesive primer) such as a polyvinyl adhesive.

After the liquid resin is introduced into the second pattern area, it is solidified. The solidification conditions vary in accordance with the resin chosen. In the case of a radiation cured liquid resin, the resin is exposed to U.V. radiation to harden the liquid resin composition. In the case of a two part liquid resin composition, the two resin parts are premixed prior to introducing the liquid resin into the second pattern area and the resin is permitted to harden at ambient or elevated temperature depending upon the hardening requirements. In the case of single part liquid resins, which are heat curable, the resins are simply exposed to the required temperature for the required period of time provided that the temperature required is below the deformation temperature of the thermoplastic polymer of the surface. Other single part liquid resins may be hardened upon exposure to air as in the case with moisture cured silicones and urethanes. Thermoplastic polymers which are liquid at a temperature above ambient temperature but below the deformation temperature of the thermoplastic polymer of the surface may also be used as the liquid resin. Such thermoplastic polymers are melted and introduced into the second pattern area at a temperature below the deformation temperature of the thermoplastic polymer of the surface. The liquid thermoplastic polymer is then permitted to cool.

Figure 2:
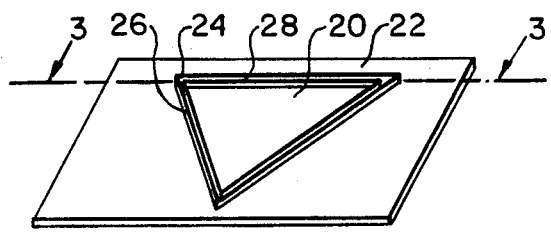
FIG. 2 is a perspective view of an article of the invention having a continuous retaining dam.
Figure 3:
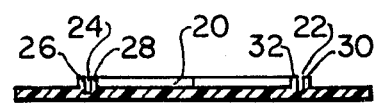
FIG. 3 is a cross sectional view taken on line 3—3 of FIG. 2.
Figure 4:
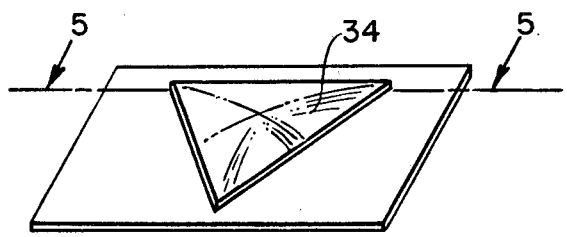
FIG. 4 is a perspective view of an article of the invention having a boss.
Figure 5:
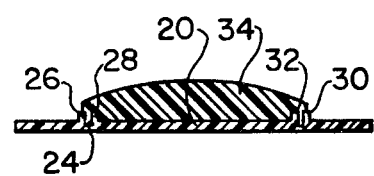
FIG. 5 is a cross sectional view taken on line 5—5 of FIG. 4.

In order to more fully understand the method and article of the invention, reference may be had to the drawings. Referring to FIG. 1, a debossing die 10 is used to press a thermoplastic sheet 12 which comprises a surface 14. The debossing die comprises continuous edge 16 which defines a first pattern area 18. The engaging of edge 16 against surface 14 when surface 14 is heated to a temperature above the softening temperature of the thermoplastic surface 14, results in a second pattern area 20 on surface 14. As best seen in FIGS. 2 and 3, the second pattern area 20 is encompassed by a continuous self-connecting retaining dam 22 comprising a continuous debossed region 24 between two continuous raised ridges 26 and 28. Ridges 26 and 28 have upper edges 30 and 32 respectively which are held in an essentially horizontal plane while, as best seen in FIGS. 4 and 5, liquid resin 34 is introduced into second pattern area 20. Liquid resin 34 is then solidified to form the boss upon the thermoplastic polymer surface.

The following example serves to illustrate and not limit the present invention.

EXAMPLE

A sheet of 0.04 cm thick, General Electric Lexan ® polycarbonate was placed on the flat metal base of a Kensol (1 ton) hot stamp machine. A steel rule die, in the shape of a 1.25 cm diameter circle, was attached to the heated platen of the press. The die base temperature was brought to about 220° C. The platen was lowered so that the rule die (with a rounded edge) penetrated 0.0125 cm into the sheet. The dwell time was 1 second. Examination of the sheet showed that a ridge of about 0.0025-0.005 cm in height was produced on either side of the depression. A radiation curable liquid resin, W. R. Grace AM 15D, was poured into the center of the circle until the liquid flowed to the edge of the first ridge. Even after 5 minutes, the liquid remained in the circle. The part was exposed to U.V. radiation which hardened the composition to a clear, high gloss, well formed lens.

In another experiment, a machined die with 12 rectangular pattern areas was used to simultaneously produce 12 pattern areas on the polycarbonate sheet. When the 12 areas on the sheet were filled with the liquid resin material which was then hardened, clear, high gloss, well formed lenses resulted.

What is claimed is:

1. A method for forming a boss upon an essentially planar thermoplastic polymer surface which comprises:
   (a) heating the thermoplastic polymer surface to a temperature above the deformation temperature of the thermoplastic polymer and below the decomposition and melt stick temperatures of the thermoplastic polymer;
   (b) impressing the thermoplastic surface, for from about 0.1 to about 10 seconds with a debossing die having at least one edge in the shape of a first pattern, to form a second pattern area on the surface defined and encompassed by at least one continuous self-connecting retaining dam on the surface, at least a portion of said dam being formed by said impressing by said die, said portion of said dam comprising at least one debossed region between at least two raised ridges having upper edges;
   (c) introducing into the second pattern area, a liquid resin in a quantity sufficient to fill the second pattern area and insufficient to overflow the continuous dam, the liquid resin being solidifiable at a temperature below the deformation temperature of the thermoplastic polymer, the thermoplastic polymer, having reaction and solubility rates with the liquid resin which are sufficiently slow to prevent significant weakening of said thermoplastic polymer prior to solidification of the liquid resin; and
   (d) while the upper edge of each such ridge is in an essentially horizontal plane, solidifying the liquid resin to form an elevated boss.

2. A method for forming a boss upon an essentially planar non-porous thermoplastic polymer surface which comprises:
   (a) heating the thermoplastic polymer surface to a temperature above the deformation temperature of the thermoplastic polymer and below the decomposition and melt stick temperatures of the thermoplastic polymer;
   (b) impressing the thermoplastic surface, for from about 0.1 to about 10 seconds with a debossing die having at least one continuous edge defining and encompassing a first pattern area, to form a second pattern area on the surface defined and encompassed by at least one continuous self-connecting retaining dam on the surface, the dam comprising a continuous debossed region between two continuous raised ridges having upper edges;

(c) introducing into the second pattern area, a liquid resin in a quantity sufficient to fill the second pattern area and insufficient to overflow the continuous dam, the liquid resin being solidifiable at a temperature below the deformation temperature of the thermoplastic polymer, the thermoplastic polymer, having reaction and solubility rates with the liquid resin which are sufficiently slow to prevent significant weakening of said thermoplastic polymer prior to solidification of the liquid resin; and (d) while the upper edge of each such ridge is in an essentially horizontal plane, solidifying the liquid resin to form an elevated boss.

3. The method of claim 1 wherein the thermoplastic polymer is a linear polycarbonate, modified cellulose, polyester, acrylic, polyamide, thermosetting prepolymer or polyvinyl polymer.

4. The method of claim 3 wherein the liquid resin is selected from the group consisting of catalyzed urethanes, catalyzed epoxies, radiation curable polymers, heat curable polymers which are cured at a temperature below the deformation temperature of the thermoplastic polymer of the surface, and thermoplastic polymers which solidify at a temperature below the deformation temperature of the thermoplastic polymer of the polymer surface.

5. The method of claim 2 wherein the thermoplastic polymer is a linear polycarbonate, modified cellulose, polyester, acrylic, polyamide, thermosetting prepolymer or polyvinyl polymer.

6. The method of claim 5 wherein the liquid resin is selected from the group consisting of catalyzed urethanes, catalyzed epoxies, radiation curable polymers, heat curable polymers which are cured at a temperature below the deformation temperature of the thermoplastic polymer of the surface, and thermoplastic polymers which solidify at a temperature below the deformation temperature of the thermoplastic polymer of the polymer surface.

7. The method of claim 2 wherein the debossing die has an edge thickness of from about 0.025 to about 0.4 mm.

8. The method of claim 2 wherein the heating temperature is between about 3° C. above the deformation temperature of the thermoplastic polymer and about 3° C. below the decomposition and melt stick temperatures of the thermoplastic polymer.

9. The method of claim 1 wherein the heating occurs simultaneously with the impressing.

10. The method of claim 2 wherein the heating occurs simultaneously with the debossing.

11. The method of claim 10 wherein the heating and impressing is accomplished with a debossing die heated to from about 175° to about 250° C.

12. The method of claim 11 wherein the thermoplastic surface is a polycarbonate.

13. The method of claim 12 wherein the liquid resin is a radiation curable prepolymer containing radiation linkable polythiol and polyene groups.

14. The method of claim 2 wherein said liquid resin is sufficiently soluble or reactive with said thermoplastic surface to create good adhesion between the solidified resin and the thermoplastic surface.

15. The method of claim 2 wherein said thermoplastic surface is coated with an adhesive primer to increase adhesion between said surface and the solidified resin.

16. The method of claim 1 wherein said thermoplastic surface is coated with a thermoplastic polymer primer which forms a non-porous surface which is insoluble in and is not reactive with the liquid resin.

17. The method of claim 2 wherein one of said ridges is from about 0.3 to about 1 times the height of the other of said ridges.

18. The method of claim 2 wherein one of said ridges is from about 0.05 to about 0.3 times the height of the other of said ridges.

19. The method of claim 2 wherein the minimum quantity of liquid resin sufficient to fill the second pattern area is a volume calculated by multiplying the height of the highest ridge times the area of the pattern.

* * * * *